United States Patent [19]
Jordan

[11] Patent Number: 4,989,887
[45] Date of Patent: Feb. 5, 1991

[54] METHODS AND APPARATUS FOR ADJUSTING THE CENTER OF A COLLET

[75] Inventor: Paul T. Jordan, Seneca, S.C.

[73] Assignee: Jacobs Chuck Technology Corporation, Wilmington, Del.

[21] Appl. No.: 538,909

[22] Filed: Jun. 15, 1990

[51] Int. Cl.$^5$ .............................................. B23B 31/02
[52] U.S. Cl. ........................................ 279/48; 279/42; 279/56
[58] Field of Search ............... 279/1 J, 55, 56, 59, 279/48, 52, 53, 54, 41 R, 42

[56] References Cited

U.S. PATENT DOCUMENTS

| | | | |
|---|---|---|---|
| 2,346,706 | 4/1944 | Stoner | 279/46 |
| 2,430,603 | 11/1947 | De Good | 192/79 |
| 2,985,456 | 5/1961 | Stoner | 279/51 |
| 3,022,082 | 2/1962 | Haviland | 279/1 |
| 3,529,841 | 9/1970 | Hall | 279/6 |
| 4,097,179 | 6/1978 | Gersch | 408/151 |
| 4,677,885 | 7/1987 | Schmid et al. | 82/40 R |

Primary Examiner—Daniel W. Howell
Attorney, Agent, or Firm—Robert R. Jackson

[57] ABSTRACT

The center of a collet having a plurality of individual gripper members resiliently spaced apart in an annular array and operated on by a frustoconical surface can be adjusted by displacing some of the gripper members more than others of said gripper members parallel to the axis with which both the annular array and the frustoconical surface are nominally concentric. This causes the frustoconical surface to produce greater radial displacement of some of the gripper members, thereby shifting the center of the collet transverse to the above-mentioned axis.

6 Claims, 2 Drawing Sheets

METHODS AND APPARATUS FOR ADJUSTING THE CENTER OF A COLLET

BACKGROUND OF THE INVENTION

This invention relates to collets, and more particularly to collets of the type including a plurality of substantially rigid gripper members in an annular array, said gripper members being angularly or circumferentially spaced apart in said array by resilient members or resilient means.

It would frequently be advantageous to be able to adjust the location of the center of a collet transverse to the axis with which the collet is nominally concentric. Such adjustment would make it possible to compensate for minor imperfections in the collet and/or in the object being gripped by the collet.

It is therefore an object of this invention to provide improved collets and/or improved collet application methods.

It is a more particular object of this invention to provide collets and/or collet application methods in which the center of the collet can be shifted transverse to the axis with which the collet is nominally concentric.

SUMMARY OF THE INVENTION

These and other objects of the invention are accomplished in accordance with the principles of the invention by modifying a collet of the type (shown, for example, in Stoner U.S. Pat. Nos. 2,346,706 and Haviland 3,022,082) having a plurality of individual gripper members spaced apart from one another in an annular array by resilient material. The circumferential spacing of the gripper members in such collets is changed by forcing the gripper members against a frustoconical surface in a direction substantially parallel to the longitudinal axis of the collet. The modification of such a collet in accordance with this invention involves adding means for allowing some of the gripper members to be displaced relative to others of said gripper members parallel to said longitudinal axis. This causes the center of the collet to shift transversely to said longitudinal axis.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
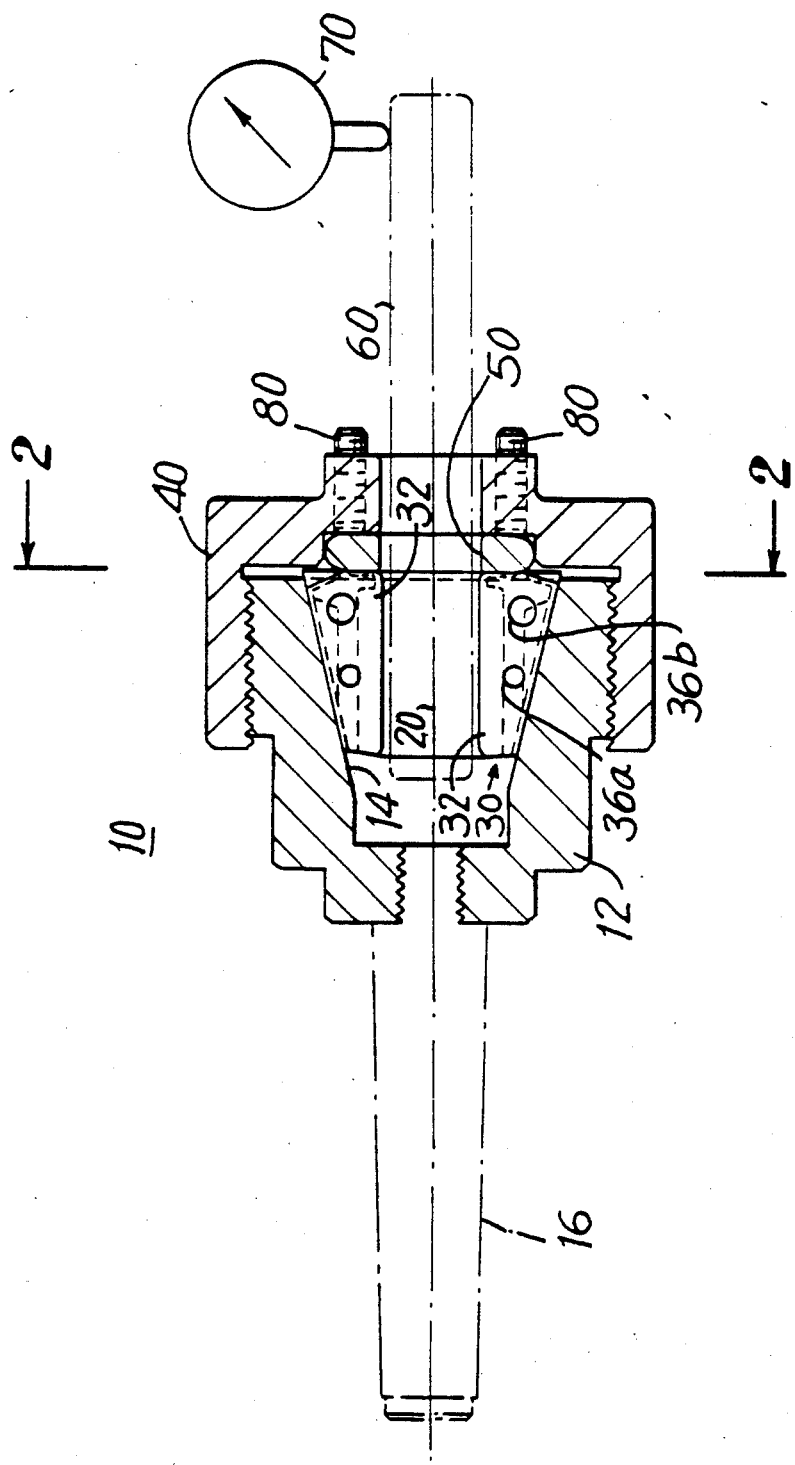
FIG. 1 is a simplified longitudinal sectional view of an illustrative collet constructed in accordance with this invention.

As shown in FIG. 1 a collet 10 constructed in accordance with this invention includes a body 12 having a frustoconical inner surface 14. Collet 10 is typically mounted on an arbor or shaft 16 so that the collet can be rotated about its central longitudinal axis 20 by rotation of arbor 16 about that axis.

Figure 2:
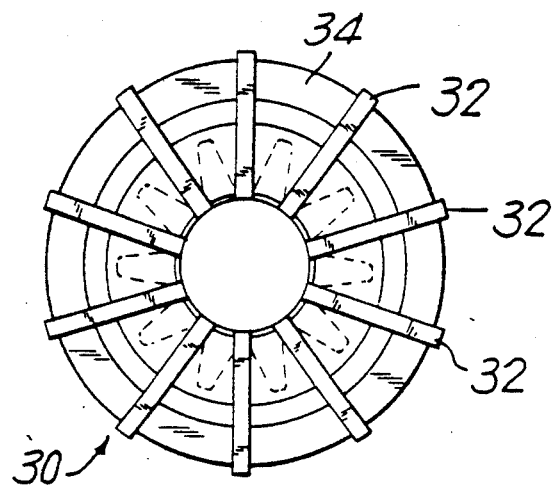
FIG. 2 is an axial end view (taken along the line 2—2 in FIG. 1) of a portion of the collet of FIG. 1.

Inside body 12 is an annular structure 30 which is nominally concentric with axis 20 and which includes a plurality of individual metal gripper members 32 angularly spaced apart from one another as shown in FIG. 2 by resilient material 34 (e.g., a rubber or plastic material). Although other techniques can be used for providing annular structure 30, in the depicted preferred embodiment each of gripper members 32 is a substantially flat, blade-like member disposed in a plane which includes and extends radially out from axis 20. Members 32 are embedded in an annulus of rubber material, and two or more holes 36a and 36b are provided in each member 32 so that the rubber material can pass through those holes in order to help hold members 32 in place in the rubber annulus. The outer surfaces of members 32 are inclined to mate with frustoconical surface 14.

The outer surface of body 12 is threaded to receive nut 40 which is also nominally concentric with axis 20. Ring 50 is disposed inside collet 10 between nut 40 and the axial end of structure 30 which is generally opposite frustoconical surface 14. Accordingly, when nut 40 is tightened on body 12, nut 40 forces ring 50 against the end of annular structure 30. This forces annular structure 30 against frustoconical surface 14, thereby annularly compressing annular structure 30 and causing it to annularly grip a cylindrical object 60 (e.g., a tool or workpiece) disposed in the collet. In other words, as annular structure 30 is forced to the left relative to body 12 as viewed in FIG. 1, frustoconical surface 14 forces gripper members 32 radially inward into gripping engagement with object 60. The surrounding resilient material 34 yields to allow the circumferential spacing between gripper members 32 to decrease.

After collet 10 has been tightened on object 60 as described above, the set-up may be tested for concentricity with axis 20. This may be accomplished, for example, by placing the actuator of a dial-type displacement indicator 70 in contact with the peripheral surface of object 60 and rotating collet 10. If the set-up is concentric with axis 20, the pointer of indicator 70 will remain relatively stationary. On the other hand, if the set-up is not concentric, the pointer of indicator 70 will oscillate as the collet is rotated. Concentricity can then be achieved by adjusting the collet in accordance with this invention as will now be explained.

Figure 3:
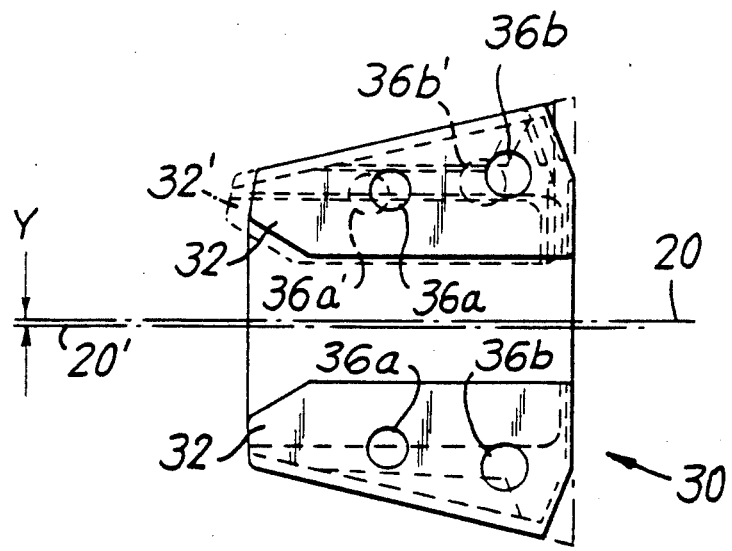
FIG. 3 is similar to a portion of FIG. 1 showing how that portion operates in accordance with this invention.

A plurality of set screws 80 is provided in nut 40 so that each set screw extends through the nut parallel to longitudinal axis 20 and bears on ring 50. Set screws 80 are distributed around nut 40 in an annular array. Accordingly, ring 50 can be cocked or inclined relative to a plane perpendicular to axis 20 by tightening some of set screws 80 more than others. This cocking of ring 50 distorts annular structure 30 in the manner shown in dotted lines in FIG. 3. In particular, it axially displaces some of gripper members 32 more than others of the gripper members along frustoconical surface 14. This causes frustoconical surface 14 to force those gripper members 32 having the greater axial displacement farther inward toward axis 20 than the gripper members on the other side of the collet which have lesser axial displacement. This in turn causes the center of the collet to shift transversely (the parameter Y in FIG. 3), thereby adjusting the concentricity of the collet and object 60. This adjustment can be made in any radial direction of collet 10 by adjustment of the appropriate ones of set screws 80.

It will be apparent that the foregoing is merely illustrative of the principles of this invention, and that various modifications can be made by those skilled in the art without departing from the scope and spirit of the invention. For example, it may be preferable to start out with all of set screws 80 advanced somewhat, so that when an adjustment is necessary after the collet has been tightened on object 60, this can be achieved by tightening some set screws and loosening others, thereby shifting the center of collet 10 transversely while maintaining approximately constant gripping force on object 60.

The invention claimed is:

1. A collet having a plurality of substantially rigid gripper members disposed in an annular array and circumferentially spaced from one another by resilient means, a frustoconical surface substantially concentric with said annular array, and means for forcing said annular array against said frustoconical surface substantially parallel to an axis concentric with said annular array so that said frustoconical surface changes the circumferential spacing between said gripper members, said collet further comprising means for displacing some of said gripper members relative to others of said gripper members along said frustoconical surface in a direction generally parallel to said axis in order to shift the center of said array in a direction transverse to said axis.

2. The apparatus defined in claim 1 further comprising an annular member substantially concentric with said axis and in contact with said annular array in opposition to said frustoconical surface, and means for inclining said annular member relative to a plane perpendicular to said axis.

3. The apparatus defined in claim 2 wherein said frustoconical surface is a surface of a body member, wherein said means for forcing comprises a nut member concentric with said axis and threadedly engaged with said body member, said annular member being interposed between said nut member and said annular array, and wherein said means for inclining comprises means for inclining said annular member relative to said nut member.

4. The apparatus defined in claim 3 wherein said means for inclining said annular member relative to said nut member comprises at least one set screw extending through said nut member substantially parallel to said axis and bearing on said annular member.

5. The method of operating a collet having a plurality of substantially rigid gripper members disposed in an annular array and circumferentially spaced from one another by resilient means, a frustoconical surface substantially concentric with said annular array, and means for forcing said annular array against said frustoconical surface substantially parallel to an axis concentric with said annular array so that said frustoconical surface changes the radial positions of said gripper members, said method comprising the steps of:

positioning an object substantially concentrically with said annular array;

operating said means for forcing in order to cause said gripper members to annularly grip said object; and displacing some of said gripper members relative to others of said gripper members parallel to said axis in order to shift the center of said array and said object in a direction transverse to said axis.

6. The method defined in claim 5 further comprising the step of:

after said step of operating said means for forcing, rotating said collet and said object in order to determine the direction transverse to said axis in which said center should be moved by performance of said step of displacing some of said gripper members.

* * * * *